US007324957B2

(12) United States Patent
Boys (10) Patent No.: US 7,324,957 B2
(45) Date of Patent: Jan. 29, 2008

(54) PROXIMAL ADVERTISING USING HAND-HELD COMMUNICATION DEVICES

(75) Inventor: Mark A. Boys, Aromas, CA (US)

(73) Assignee: SoundStarts, Inc., Aromas, CA (US)

( * ) Notice: Subject to any disclaimer, the term of this patent is extended or adjusted under 35 U.S.C. 154(b) by 168 days.

(21) Appl. No.: 10/972,120

(22) Filed: Oct. 21, 2004

(65) Prior Publication Data

US 2006/0089876 A1   Apr. 27, 2006

Related U.S. Application Data

(63) Continuation-in-part of application No. 10/733,076, filed on Dec. 10, 2003, which is a continuation of application No. 09/755,768, filed on Jan. 5, 2001, now Pat. No. 6,690,918.

(51) Int. Cl.
*G06Q 30/00* (2006.01)
(52) U.S. Cl. ..................................................... 705/14
(58) Field of Classification Search .................. 705/14
See application file for complete search history.

(56) References Cited

U.S. PATENT DOCUMENTS

| | | | | |
|---|---|---|---|---|
| 6,690,918 | B2 * | 2/2004 | Evans et al. | 455/41.2 |
| 7,127,261 | B2 * | 10/2006 | Van Erlach | 455/456.5 |
| 7,177,594 | B2 * | 2/2007 | Burr | 455/41.2 |
| 2001/0032193 | A1 * | 10/2001 | Ferber | 705/79 |
| 2001/0047294 | A1 * | 11/2001 | Rothschild | 705/14 |
| 2002/0169662 | A1 * | 11/2002 | Claiborne | 705/14 |
| 2002/0198851 | A1 * | 12/2002 | Hashimoto et al. | 705/400 |
| 2003/0093311 | A1 * | 5/2003 | Knowlson | 705/10 |
| 2003/0101283 | A1 * | 5/2003 | Lewis et al. | 709/246 |
| 2003/0105719 | A1 * | 6/2003 | Berger et al. | 705/51 |
| 2003/0110507 | A1 * | 6/2003 | Dimitrova et al. | 725/110 |
| 2004/0137886 | A1 * | 7/2004 | Ross et al. | 455/414.1 |

(Continued)

FOREIGN PATENT DOCUMENTS

EP       1143360 A2 * 10/2001

(Continued)

OTHER PUBLICATIONS

Mack, A.M, "Going Local," Adweek, vol. 41, No. 28, pp. 38-39, Jul. 10, 2000.*

(Continued)

*Primary Examiner*—Nicholas D. Rosen
(74) *Attorney, Agent, or Firm*—Central Coast Patent Agency, Inc.

(57) ABSTRACT

A system for commercial promotion has a first computerized appliance enabled for data reception on a close-proximity wireless local area network (LAN) having a limited effective range, and for providing received data in a human-understandable form to a user of the first appliance, and a second computerized appliance enabled for data transmission on the close-proximity wireless LAN and having access to a data repository storing promotional material. The first and the second computerized appliances establish a connection on the wireless LAN by virtue of proximity within the limited effective range, the second appliance transmits promotional material to the first appliance in response to the connection, and the first appliance renders the promotional material in human-understandable form for the user in response to receiving the promotional material.

2 Claims, 5 Drawing Sheets

U.S. PATENT DOCUMENTS

2004/0158492 A1* 8/2004 Lopez et al. .................. 705/14
2006/0036491 A1* 2/2006 Leung et al. ................. 705/14
2006/0064346 A1* 3/2006 Steenstra et al. ............. 705/14

FOREIGN PATENT DOCUMENTS

| WO | WO 01/45061 A2 | 6/2001 |
| WO | WO-0145061 A2 * | 6/2001 |
| WO | WO 2004/012175 A1 | 2/2004 |
| WO | WO-2004012175 A1 * | 2/2004 |

OTHER PUBLICATIONS

Simon, H., "Sinking Your Teeth into M-Commerce," Intelligent Enterprise, vol. 3, No. 13, p. 60, Aug. 18, 2000.*

Swartz, N., "Wireless Ads" Loved/Loathed, Wirless Review, vol. 17, No. 19, p. 60, Oct. 1, 2000.*

Anon., "Location-Based M-Advertising Trial to Debut," Newsbytes News Network, Nov. 9, 2000.*

Gray, R., "Hit a Moving Target," Marketing, pp. 45-46, Nov. 16, 2000.*

Evans, D., "WAP: Location, Location, Location," PC Magazine, 112, Apr. 17, 2001.*

Anon., "Philips Launches Advanced, High-Speed Beacon Connectivity Technology," PR Newswire, Jun. 4, 2001.*

Anon., "Rainer: Consumers Warn Companies: Go Easy on Bluejacking; Rainer PR Survey Shows High Bluetooth Awareness but Short Shrift for Sneaky Mobile Marketing Tactics," M2 Presswire, Dec. 4, 2003.*

Anon., "Insight: Out of the Blue," New Media Age, p. 20, Jan. 8, 2004.*

Anon., "Filter-UK Plans Launch of Bluetooth Marketing Tool," New Media Age, p. 7, Jul. 29, 2004.*

ANONYMOUS, Insight: Out of the Blue, New Media Age, Jan. 8, 2004, p. 20, Copyright: Centaur Communications Ltd. and Licensors.

Hank Simon, Sinking Your Teeth Into M-Commerce, Intelligent Enterprise, Aug. 18, 2000, p. 60, vol. 2, No. 13, The Gale Group.

Robert Gray, Hit a Moving Target, Nov. 16, 2000, pp. 45-46, ProQuest Info & Learning.

Daniel Evans, WAP: Location, Location, Location, PC Magazine, Apr. 17, 2001, p. 112, The Gale Group.

Nikki Swartz, Wireless Ads: Loved/Loathed, Wireless Review, Oct. 1, 2000, p. 60, vol. 17, No. 19, The Gale Group.

Ann M. Mack, Going Local, Adweek, Jul. 10, 2000, pp. 38-39, vol. 41, No. 28, ProQuest Info & Learning.

ANONYMOUS, Location-Based M-Advertising Trial To Debut, Newsbytes News Network, Nov. 9, 2000, The Gale Group.

ANONYMOUS, Philips Launches Advances, High-Speed Beacon Connectivity Technology, PR Newswire, Jun. 4, 2001, Dialog Global Reporter.

ANONYMOUS, Rainer: Consumers Warn Companies: Go Easy On Bluejacking; Rainer PR Survey Shows High Bluetooth Awareness but Short Shrift for Sneaky Mobile Marketing Tactics, M2 Presswire, Dec. 4, 2003, Dialog Global Reporter.

ANONYMOUS, Filter-UK Plans Launch of Bluetooth Marketing Tool, New Media Age, Jul. 29, 2004, p. 7, ProQuest Info & Learning.

* cited by examiner

PROXIMAL ADVERTISING USING HAND-HELD COMMUNICATION DEVICES

CROSS-REFERENCE TO RELATED DOCUMENTS

The present application is a continuation-in-part of, and claims priority to, co-pending patent application Ser. No. 10/733,076 entitled "Networking by Matching Profile Information Over a Data Packet-Network and a Local Area Network", which was filed on Dec. 10, 2003, which is a continuation of patent application Ser. No. 09/755,768 entitled "Networking by Matching Profile Jn*rmation Over a Data Packet-Network and a Local Area Network", which was filed on Jan. 5, 2001, and issued as patent Ser. No. 6,690,918 on Feb. 10, 2004. Both of the above mentioned properties are incorporated herein in their entirety.

FIELD OF THE INVENTION

The present invention is in the field of network communications including Internet communications and pertains more particularly to methods for optimizing the networking experience for users by enabling priority profile matching as a predecessor to networking sessions, and in some embodiments enabling close proximity ad and or coupon serving.

BACKGROUND OF THE INVENTION

Capability for person-to-person communication has been enhanced greatly through recent development in wireless telephony and Internet technology. Anyone with a suitable wireless digital personal appliance or Internet appliance such as a personal computer with a standard Internet connection may access and communicate with other such equipped persons for the purpose of pleasure, business, or shared activities. There has also been great acceptance of technology for person-to-person communication with the purpose of making initial contact in an anonymous manner so as to provide two parties with a method of determining a desire (or lack) to further communicate semi-anonymously until the two parties decide to, or not to, meet face-to-face.

One problem that is encountered by an individual practicing this manner of communication is a lack of being able to immediately communicate with potentially desirable parties, and in many cases a lack of specific information as to the locality of a person to whom they might wish to communicate. Many prior-art services currently provide communication paths, such as Internet or newsprint personal advertisements, for example. These services provide a capability to respond but that capability is dependent on some time lapse between the time of placing the advertisement and receipt of responses to the advertisements. In these methods there is a considerable time lapse between the receipt of the response and initiating a reply to the initial interest.

In addition to the above, the profile information in such prior-art services is often sketchy and location information may indicate only a city or general geographic location. Time response using Internet paths is dependent on the person placing the advertisement to access the responses to their advertisement and reply. This may be accomplished in a matter of minutes or days depending on personal interests and habits. Time response in newsprint scenarios will take days or weeks depending on the time of placing the advertisement, publication timeframes, and reader search and response.

Another issue placing limitations on prior-art applications of personal communication services is the process in which the replies to personal advertisements are made. In the Internet application described above, one needs a PC or sophisticated digital appliance to search the personals services and reply usually via Internet to an interesting party. In the newsprint application, a responder most often has to reply to a cited telephone number or in some cases, send a letter to designated address. A significant limitation of current and prior-art services is the lack of availability of immediate and specific location information of the two parties utilizing a personal communications service.

A short-range radio technology system, known to the inventors as Blue tooth™, provides a capability for communications among digital devices using local wireless/cellular networks and the Internet and provides simplified data synchronization between such Net devices and computers.

Bluetooth™ firmware installed on a wireless device continually broadcasts and searches within a defined radius for other devices having Bluetooth™ technology capability. When such devices are "in range" they may communicate with one other. It has occurred to the inventors that this technology may be exploited and modified to provide meeting services based on profiling. Any other form of immediate proximity enabled wireless technologies may also be used.

What is clearly needed is an Internet-enhanced networking system applicable to wireless technology that enables users to quickly locate interested parties based on priority profiling wherein profile matching and acceptance is a predecessor for communication and possibly meeting. Such a system greatly would greatly enhance any networking situation wherein it is desired to have knowledge of the participants before initiating non-anonymous communication.

Also in another aspect, the same sort of systems needed to meet the needs described above might be used to provide a proximity-based ad or coupon service, wherein wirelessly transmitting ad servers, in some cases a part of specific business locations, may advertise to, and provide discounts and coupons, for example, to persons having enabled digital communication devices, such as cellular telephones PDAs or other devices.

SUMMARY OF THE INVENTION

In an embodiment of the invention a system for commercial promotion is provided, comprising a first computerized appliance enabled for data reception on a close-proximity wireless local area network (LAN) having a limited effective range, and for providing received data in a human-understandable form to a user of the first appliance, and a second computerized appliance enabled for data transmission on the close-proximity wireless LAN and having access to a data repository storing promotional material. The first and the second computerized appliances establish a connection on the wireless LAN by virtue of proximity within the limited effective range, the second appliance transmits promotional material to the first appliance in response to the connection, and the first appliance renders the promotional material in human-understandable form for the user in response to receiving the promotional material.

In one embodiment the first and the second computerized appliances are one of a cellular telephone, a personal digital assistant (PDA), or a pager device, each enabled for the wireless LAN connection and activity. Also in an embodiment the provision of received data in human-understandable form is through audio output, and in an alternative embodiment the provision of received data in human-understandable form is through display on a digital display of the first appliance.

In one embodiment the user of the first appliance is a potential consumer, the second appliance is at a business premise, and the promotional material advertises or otherwise promotes a product or service of the business. The promotional material may include a discount for purchase of the product or service, or a coupon redeemable by the business for a product or service. The coupon may be date and time stamped and may bear an authorization mechanism retrievable at the business for verification.

In one embodiment the second appliance is Internet-capable, and retrieves promotional material from a service provider remote from the business and having an Internet-connected server. The service provider may have a profile for the user of the first appliance as a subscriber, and the second appliance may connect with the first appliance only if the user of the first appliance is a subscriber.

In some embodiments the second appliance is Internet-capable, and retrieves promotional material from a service provider remote from the business and having an Internet-connected server, and the service provider also provides a service for subscribers to trade with the coupons. In some embodiments the service provider also does accounting and billing for trades in coupons.

In yet another embodiment the user of the first appliance is a potential consumer, the second appliance is carried by a vendor person with a product or service to vend, and the promotional material advertises or otherwise promotes the product or service of the vendor person.

In another aspect of the present invention a method for commercial promotion is provided, comprising steps of (a) establishing a connection on a wireless local area network (LAN) having a limited effective range between a first computerized appliance enabled for data reception on the LAN and a second computerized appliance enabled for data transmission on the LAN, the connection in response to the two appliances coming within the effective range; (b) transmitting promotional material from the second appliance to the first appliance in response to the connection; and (c) rendering the promotional material in human-understandable form by the first appliance for a user of the first appliance.

In one embodiment of the method the first and the second computerized appliances are one of a cellular telephone, a personal digital assistant (PDA), or a pager device, each enabled for the wireless LAN connection and activity. In some cases provision of received data in human-understandable form is through audio output, and in some other cases the provision of received data in human-understandable form is through display on a digital display of the first appliance.

In another embodiment the user of the first appliance is a potential consumer, the second appliance is at a business premise, and the promotional material advertises or otherwise promotes a product or service of the business. The promotional material may include a discount for purchase of the product or service, and may include a coupon redeemable by the business for a product or service. The coupon may be date and time stamped and may bear an authorization mechanism retrievable at the business for verification.

In some embodiments the second appliance is Internet-capable, and retrieves promotional material from a service provider remote from the business and having an Internet-connected server. Also in some embodiments the service provider has a profile for the user of the first appliance as a subscriber, and the second appliance connects with the first appliance only if the user of the first appliance is a subscriber. In still other embodiments the second appliance is Internet-capable, and retrieves promotional material from a service provider remote from the business and having an Internet-connected server, and the service provider also provides a service for subscribers to trade with the coupons. The service provider may also do accounting and billing for trades in coupons.

In still other embodiments the user of the first appliance is a potential consumer, the second appliance is carried by a vendor person with a product or service to vend, and the promotional material advertises or otherwise promotes the product or service of the vendor person.

DESCRIPTION OF THE PREFERRED EMBODIMENTS

According to a preferred embodiment of the present invention, a unique system is provided and adapted to provide services to users who have a capability of using a wireless LAN to communicate directly via Net devices or to users having Internet access capability through wireless or cellular networks and devices. Such a system provides a location-sensitive prioritized profile-matching service for users with a method for accessing that information via handheld and personal digital appliances through a telephony interface direct to established databases. The methods and apparatus of the present invention are described in enabling detail below.

Figure 1:
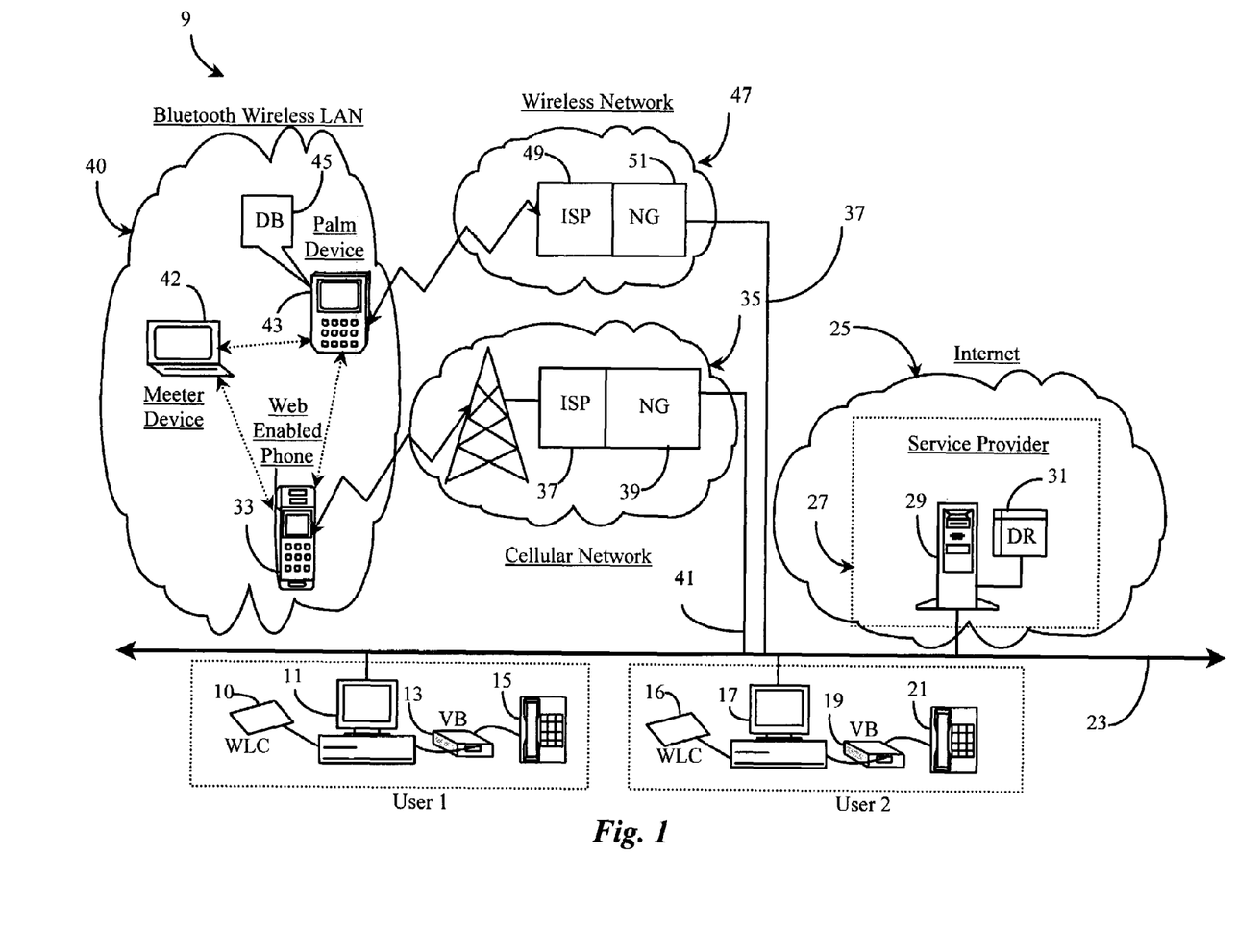
FIG. 1 is an architectural overview of a communication network wherein priority profile exchange is practiced as a predecessor to networking sessions according to an embodiment of the present invention.

FIG. 1 is an architectural overview of a communications network 9 wherein priority profile exchange is practiced as a predecessor to networking sessions according to an embodiment of the present invention.

Communications network 9 comprises a wireless local-area-network (LAN) 40, a wireless data network 47, a cellular network 35, a data-packet-network (Internet) 25, and exemplary users 1 and 2 connected by PC/Internet connection to an Internet backbone 23. LAN 40 is enabled, in this embodiment, by a technology known as Bluetooth™, which provides a communication protocol as well as firmware for local device communication.

Communications network 9 represents a variety of architectures for practicing the present invention according to a plurality of embodiments. Therefore, it is the intent of the inventor to first describe all of the represented devices and communication connections, and then to describe applicable paths and scenarios for practicing the present invention.

LAN 40, as described above, is existent according to Bluetooth™ technology in that communication exists only when there are more than one device activated within an acceptable vicinity (range) of each other. It may be assumed in this example, that LAN 40 is not fixed in any way, and that it becomes applicable whenever activated devices are within range of one another.

There are a variety of exemplary wireless communications devices illustrated within LAN 40. These are a handheld computer 43, a Web-enabled phone 33, and a wireless device 42, termed a "meeter" device, by the inventor. Meeter device 42 is a proprietary device especially adapted for practicing the present invention within the scope of a wireless LAN created using Bluetooth™ technology. In this embodiment, handheld device 43 and Web-enabled phone 33 are also adapted with Bluetooth™ technology.

Wireless devices 33, and 43 are standard devices having Internet-connection capability through respective network gateways. For example, palm device 43 may access Internet 25, also represented by backbone 23, via an Internet-service-provider (ISP) 49 illustrated within intermediary wireless network 47, and an associated network gateway (NG) 51 also illustrated within network 47. NG 51 is connected to backbone 23 by an Internet access line 37 enabling Internet connectivity and communication capability to device 43. Similarly, Web-enabled phone 33, which in this embodiment is a cellular telephone, accesses Internet 25 (backbone 23) through an illustrated communications tower, a connected ISP 37, and a network gateway (NG) 39 all illustrated within cellular network 35. NG 39 is connected to backbone 23 by an Internet access line 41 enabling Internet connectivity and communication capabilities to phone 33.

In this embodiment, meeter device 42, roughly the size of a credit card in a preferred embodiment, does not have Internet-access capabilities. Rather, device 42 may only communicate in limited fashion with other devices within limited radio range. As previously described above, LAN 40 represents wireless coverage over somewhat localized areas such as 10 to 100 meters in rough diameter. Therefore, devices 33, 42, and 45 may directly communicate, using radio signals, with one another only within an operable communication range defined within a cell area as described above.

Internet 25 represents a preferred data-packet-network for practicing the present invention according to variant embodiments. Internet backbone 23 represents all of the lines, equipment, and connection points making up Internet 25 as a whole. Therefore, there are no geographic limitations to the practicing the present invention. As LAN 40 represents just one local area created by virtue of active devices within range of one another, it will be appreciated that a great many such LANs may exist simultaneously, and may be distributed over a large region wherever two or more communication-capable devices come within range of one another.

Exemplary users 1 and 2 represent users operating from home premises using Internet backbone 23 as a conduit. Users 1 and 2 are identically equipped in this example. User 1 has a PC 11 for accessing the Internet through backbone 23 and standard Internet access capabilities as known in the art. The most common of these is dial-up/modem access achieved through an ISP. There are other possibilities as well. User 1 has a voice box (VB) 13 connected to PC 11 and a telephone 15 connected to VB 13. This configuration allows voice communication over an Internet connection utilizing a standard telephone. Such configurations are known in the art and available to the inventor. User 1 also has a wireless LAN card (WLC) 10 installed on PC 11. WLC 10 is a Bluetooth™ card in this example and adapts PC 11 as a Bluetooth™ communication device. User 2 is adapted identically as user 1 by way of a PC 17 connected to backbone 23, a VB 19 connected to PC 17, a telephone 21 connected to VB 19, and a WLC 16 installed on PC 17 enabling PC 17 as a Bluetooth™ device.

A service provider 27 is provided within Internet 25 and represents a central-control station for managing and propagating user profiles according to various embodiments of the present invention. Service provider 27 comprises a file server 29 and a connected data repository 31. File server 29 is adapted as a user-interfacing server for users operating any Internet-capable device including PCs 11 and 17, device 43 within LAN 40, and device 33 within LAN 40. Data repository 31 is adapted to store user profiles and other data about users such as device identification, subscriber information, account information and so on. Profile data included in repository 31 facilitates embodiments of the present invention, which comprises networking based on prioritized profile matching and exchange.

Software (not shown) provided to reside in server 29 and within repository 31 functions to match stored "real" profiles against "request" profiles and propagates selected profiles or notice thereof to participating and requesting devices using a networking protocol. The two separate types of profiles, real and request profiles, are created by users practicing the present invention. The inventor terms the profiles "self" (real) profiles and "meet" (request) profiles.

Various embodiments of the present invention are enabled in this example by various communication paths illustrated herein. Therefore users having varying intents may practice the invention using variant communications paths and obtain results accordingly. An important goal of the present invention is to provide users with an ability to "see" pertinent profiles (real) attributed to any other users before initiating committed contact in a way that enables quick contact and fulfills a variety of user interests.

For example, assume that LAN 40 exists by virtue of a plurality of users congregating at a popular nightclub while practicing the present invention. In this consideration, logical user intent would be to meet other users having desirable qualities purposeful of social interaction. Although not required, assume that the plurality of users all have devices identical to device 42. Device 42 is, in this scenario, a credit-card sized communication device enabled with Bluetooth™ technology as previously described. Device 42 can be similar in operation to a paging device and has at least a display screen, a limited key-pad, and a capability of receiving and sending messages from and to other like devices. In some embodiments device 42 may also be enhanced with limited range voice transmission and receiving capability.

In this simple example, Internet 25 and other illustrated networks and paths and equipment do not come in to play. Each device 42 has a relatively powerful microprocessor that enables users to configure and store real and request profiles, and enables each device to match received (real) profiles with profiles (request) already stored. Each user, before arriving at the particular nightclub, has configured at least one real profile and one request profile into his or her device 42. When users activate their devices at the nightclub, LAN 40 comes into existence as devices begin communicating with each other in the sharing and matching of profile information. For example, when one user comes into range of another, each device will send a real profile to the other device. These profiles are received by each participating device and matched against request profiles (what users are looking for) stored on each device. If a match, or in some embodiments, a partial match occurs, the device making the match beeps, vibrates, or alerts the user in some other fashion. The matching profile is displayed on the device with an option to contact the device that sent the matching profile. Contact may be similar to a page, or may be enhanced with voice communication capability in some embodiments.

In one embodiment of the present invention, a range of only 10 meters (about 32 feet) allows an optimum chance for user-identification of the owner of a device that sent a matching profile. When the range is 100 meters, there may be many more profiles being traded and matched lending necessity to device identification and paging capability. If a device is paged because of a matching profile, the owner of the device can see the real profile of the user operating the paging device. If desired, the owner may answer the page and identify him or herself. If the owner does not like the profile, then he or she need not answer. In one embodiment as described above device 42 is further enhanced with short-range voice capabilities allowing consenting users to speak with each other.

The above-described situation represents a simple embodiment wherein only users within range of each other may exchange profile information. It will be appreciated that this technology may be practiced in any location or dynamically, with users moving about.

In another example, consider that users are now operating hand-held devices such as hand-held device 43, and/or cellular phones such as phone 33. In this situation LAN 40 is enhanced with accessibility to the Internet network. A new dynamic comes into play in that users may now share profiles with each other and, in some cases, depending on device capability, receive and send profile information from and to server 29 at provider 27. Still further, Internet enhancement enables remote users to browse locations and associated profiles in order to determine which locations are good meeting places according to their request profiles.

To illustrate the Internet enhancement using the exemplary architecture and communication paths laid out in communications network 9, consider that users operating within LAN 40 at a nightclub are uploading their real profiles to server 29, which recognizes the nightclub as a local and popular club for singles. Devices 43 and 33 in this example may accomplish uploading of profile information.

Device 43 may upload profile information through ISP 49, NG 51, access line 37, backbone 23 into server 29. Server 29 temporarily stores the profile information from device 43 in database 31. Similarly, device 33 (cell phone) may upload profile information through cell tower and connected ISP 37, NG 39, access line 41, backbone 23 into server 29 whereupon the information is also stored in repository 31. Now, the profiles of the owners of devices 43 and 33 are available on-line to browsing members. Assume now that Users 1 and 2 have logged on to Internet 25 by accessing backbone 23 and are engaged in browsing of server 29. Users 1 and 2 may be looking for a popular spot locally where there is a good chance to meet someone in which they might be interested. User 2 may browse uploaded profiles of those users currently patronizing nightclub (LAN 40).

If interested, user 2 may download real profiles for matching with his or her request profile stored locally on PC 17. In another embodiment, user 2 may upload a request profile to server 29 and have it matched with real profiles stored in repository 31. In either case, if there are matches, user 2 may decide to travel to the popular nightclub with a Bluetooth™ enabled device similar to any of those illustrated within LAN 40. Alternatively, user 2 may select to send a notice and real profile to the owner of a device whose profile matched the request profile of user 2. In this case, remote communication may be established between user 2 and a user operating either device 43 or device 33 within LAN 40. User 1 has the same capability as described with respect to user 2. It is important to note herein that all real identification information such as names, phone numbers and the like are not provided during initial exchange in order to protect anonymity and privacy of users.

In another embodiment, one or more users may act as Internet hosts for other users if their devices have the required capabilities. In this situation, hand-held device 43, for example, is capable of storing many downloaded profiles as illustrated by a database (DB) 45 installed therein. Device 43 may share profiles locally, receive profiles from the Internet, and match them with other profiles of other users. It is important to note that service provider 27 may interface with any user operating Internet-capable devices through server 29 in order to the receive profile information described above and, perhaps, location information comprising the name and the location of the nightclub. Server 29 stores this information in repository 31 tagged to the sending user identification.

In the above-described example wherein LAN 40 exists at a popular nightclub, for example, real (self) and request (meet) profiles reflect personal data such as appearance, interests, hobbies, income, marital status, and may include temporary information such as purpose for attending the nightclub. A request profile would essentially carry the same type of information. A request profile reflects a user's desired attributes in someone with whom they might consider socializing. In a nightclub, this information would tend to gravitate around dating and social interaction. For sports, people may meet for sailing, tennis, soccer, golf etc. or for someone to play games like bridge, pool, etc. In other situations, profiles may reflect business capabilities, items for sale, items wanted, or essentially any other information. It is important to note herein that service provider 27 may provide, through server 29, generic profile templates (electronic forms) for population and submission. In one embodiment, a user may create his or her own profiles having categories not already provided in a template.

Along with configuring and uploading profile information to server 29, a user may also signify a time period wherein the profiles may be considered active. For example, "activate this profile set from 6 pm to 11 pm tonight". As users arrive and begin to mingle at the particular location, such as a nightclub, an Internet host connected to server 29 begins communicating profile matches to users by beeping or buzzing the user's devices when a desirable match occurs within the vicinity of the host. This assumes, of course, that matching of profiles occurs at network level within server 29, or within the Internet host.

Meeter protocol (software) is integrated with Bluetooth™ firmware in order to enhance the former technology with the instructional capabilities for receiving and propagating profiles, matching profiles, and applying flexible "threshold" criteria set by users for defining and accepting a match. Using the protocol along with embedded LAN attributes of each device, up-linking to a central Web site and profile matching and propagation is enhanced with the one-touch data-sync capability offered by the wireless LAN synchronization protocol. In indicating a match, comparison need not be exact, and comparisons may be done in a manner to report, with an alert, a partial match, and in some cases the degree of a match, such as 70%, also the match degree of the other person may be provided.

Figure 2:
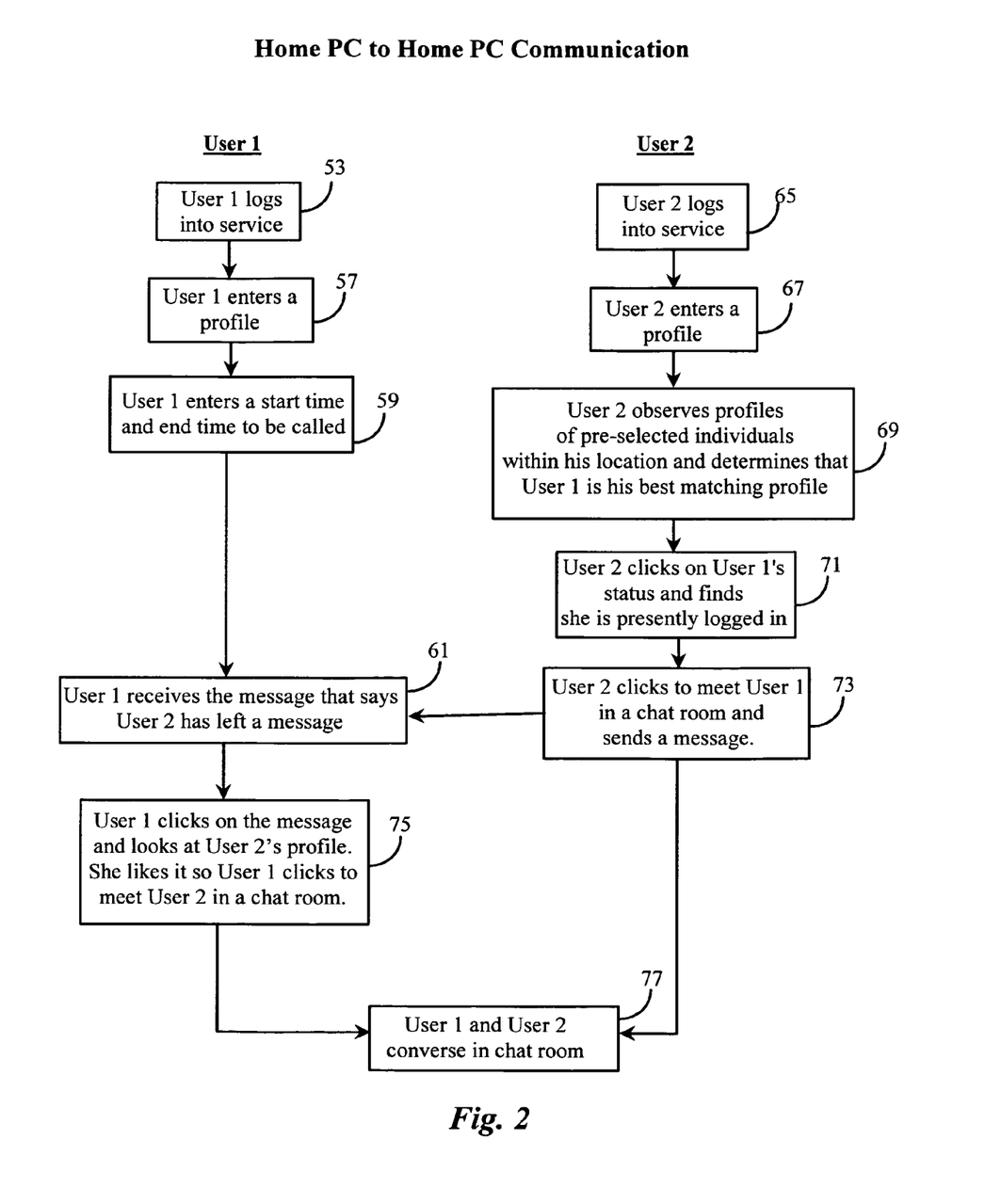
FIG. 2 is a flow chart illustrating logical steps of home PC to home PC communication using priority profile matching, according to an embodiment of the present invention.

FIG. 2 is an exemplary flow diagram representing home PC to home PC communication. At step 53, user 1 logs into the main Web-site, which in this case is service provider 27 of FIG. 1. At step 57, user 1 enters a profile of "self" and "meet" into a match server (server 29). At step 59, user 1 enters a start time and an end time to be called.

In a parallel effort, before, during or after user 1's action exemplified in steps 53-59, user 2 logs into the main Web-site at step 65. Once logged in and authenticated, user 2 enters a "self" and "meet" profile at step 67.

It is noted herein that users 1 and 2 are analogous to users 1 and 2 of FIG. 1 having VB capability and IP capabilities through respective PCs 11 and 17. At step 69 user 2, still logged into the main Web-site as described at step 65, observes available profiles of pre-selected individuals. The available profiles are priority-matched profiles of those persons within his location. Matching is accomplished by software capabilities established in server 29 of FIG. 1. The pre-selection also provides the location of pre-selected individuals and that the real profile of user 1 is the best (highest priority) match for the request profile information entered by user 2 at step 67.

At step 71, user 2 clicks on user 1's status and finds that user 1 is presently logged in to the service. At step 73, user 2 clicks the interactive indication and sends a message to user 1, the message to invite user 1 to meet in a chat room. The message technology used may be instant messaging, voice-mail, or other forms. It is important to note that the message is anonymous in that it does not reveal the sender ID or the receiver ID. At step 61, user 1 proactively receives the message indicating user 2 has left a message, or may receive a direct phone call. At step 75, user 1 accesses the message left by user 2 and reviews the real profile information of user 2, which is sent with the message. User 1 likes the information provided in user 2's profile and clicks the interactive indication to send a message to user 2 accepting the proposed meeting in a chat room. Concluding the initiation activity, user 1 and 2 meet and converse in a chat room at step 77. It is noted herein that all messaging between user 1 and 2 up until the point of final acceptance of user 1 to meet in a chat room is brokered by the service. Once in a chat room, which may be a private chat room, user 1 and 2 are left to their own devices. In other embodiments chat capability may be provided as a part of service provider 27.

This exemplary process represents just one of many possible interaction scenarios that may exist between Internet-connected PCs practicing networking according to priority profile matching. It will be apparent to one with skill in the art that the exact steps including communication mediums may be different without departing from the spirit and scope of the present invention. Such differences may be decided, for example IP phone instead of interactive chat, or dictated, for example one user cannot use a selected communication medium but can use another.

Also, matching profiles at step 69 is not limited to those profiles of people within any given location which may be local to a browsing user. Selecting those profiles within a given location only enhances the possibility of a physical meeting, which may or may not take place as the result of chat interaction.

Figure 3:
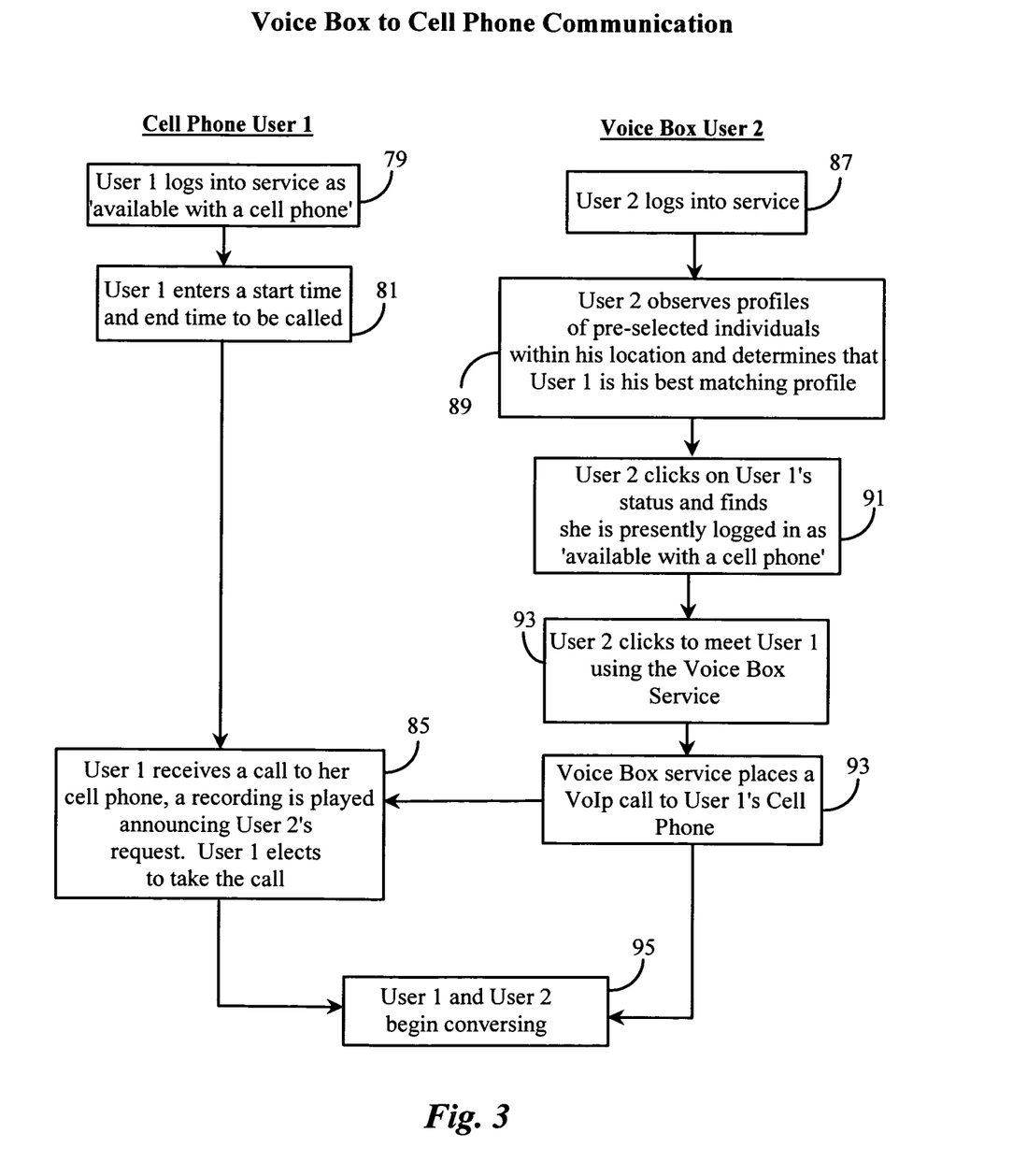
FIG. 3 is a flow chart illustrating logical steps of voice box to cell phone communication using priority profile matching according to an embodiment of the present invention.

FIG. 3 is an exemplary flow diagram representing voice box to cell phone communication. In this embodiment cell phone user 1 logs into the service as 'available with a cell phone' at step 79. In one embodiment of this mode, user 1 may be at one of a plurality of "known" establishments and is seeking interested parties that may be browsing the Web locally. User 1 enters a start time and end time to be called at step 81. It is noted herein that user 1 has entered or activated her selected profiles at the time of log-in at step 79.

In a parallel effort, user 2 logs into the service at step 87. User 2 also enters or activates selected profiles for matching. User 2 observes priority-matched profiles of individuals within the immediate or nearby locations and determines that user 1 best matches the request profile information activated by user 2. The profile matching is accomplished in the same manner as described in FIG. 2. User 2 then clicks on user 1's status and finds that person is presently logged in as 'available with a cell phone' at step 91. It may also be known to user 2 the location of user 1.

At step 93 user 2 clicks the interactive profile indication of user 1 and initiates a communication using a Voice Box (VB) analogous to VB 19 of FIG. 1. This action culminates in a voice over Internet protocol (VoIP) call placed to the cell phone of user 1 at step 94. User 1 receives a call on the target cell phone at step 85 and a voice recording is played announcing user 2's request. During the recording, the profile of user 2 is made available either through the recording, or displayed on the screen of the target phone. User 1, in this example, likes the profile of user 2 and elects to take the call in the same step 85. It is noted herein that all of the normal caller ID is not available through the VB service. In this way, the call from user 2 is made anonymously to user 1. Conversely, user 1 is anonymous to user 2 during the call request. Once user 1 elects to take the call, they may begin normal communication at step 95 and are left to their own devices. An implementation of this approach would allow a user to log in from home and register as just available, awaiting a call from a match.

This embodiment is similar to the one described in FIG. 2 except that one user is mobile and presumed to be located at a certain establishment. This is, however, not required in order to practice the present invention. A user, for example, in transit from one physical location to another may activate a "destination profile" any time before arrival. It is also noted herein that Bluetooth™ technology is not specifically required to practice the embodiments described in FIGS. 2 and 3. However, the technology enables the profile synchronization to proceed in a more efficient manner. Short-wave radio technology is not used unless profiles are exchanged locally.

Figure 4:
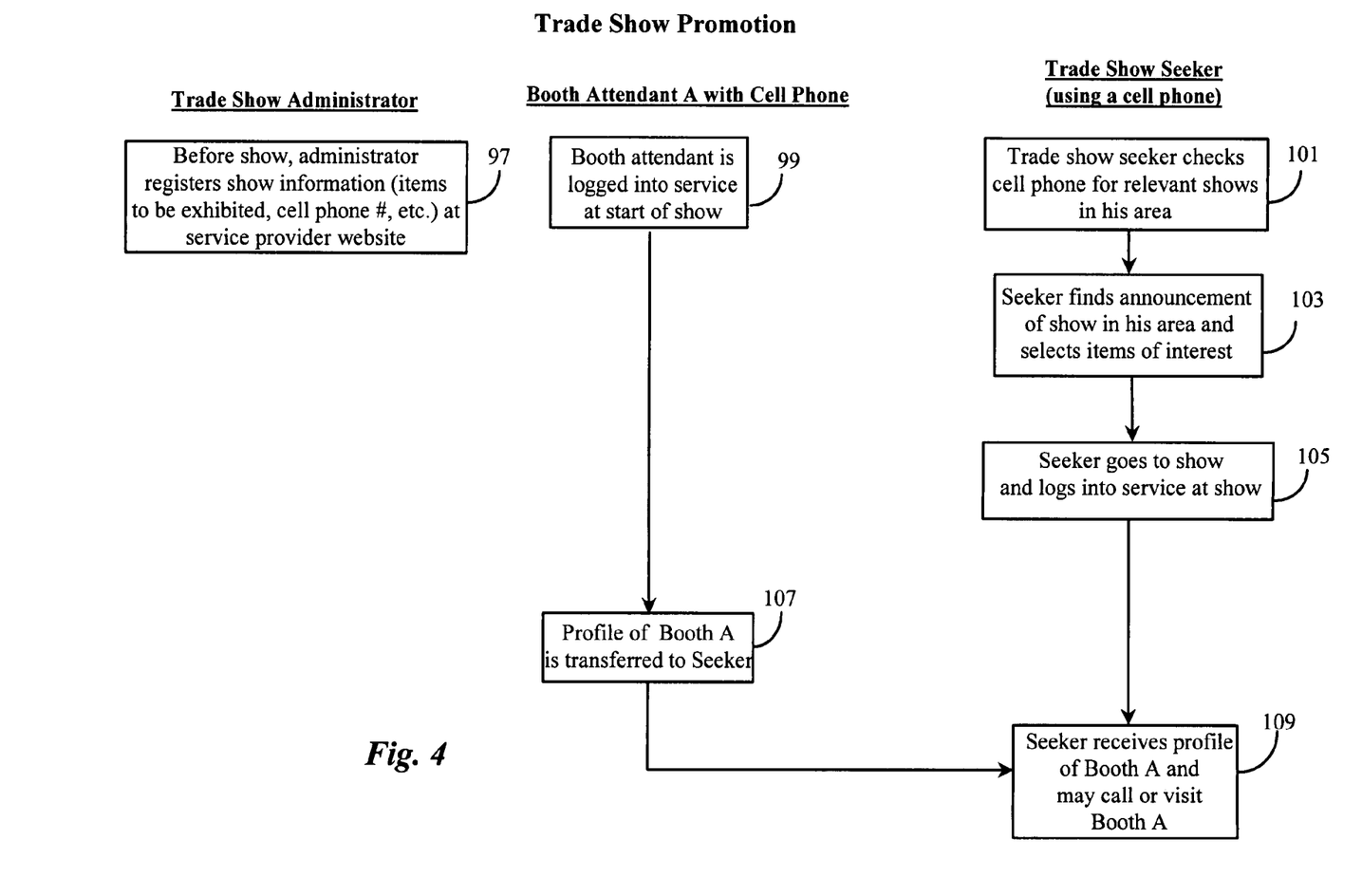
FIG. 4 is a flow chart illustrating logical steps of a trade show promotion using priority profile matching according to an embodiment of the present invention.

FIG. 4 is an exemplary flow diagram representing a trade show promotion wherein priority-profile matching is practiced according to an embodiment of the present invention. At step 97 a trade show administrator accesses the service (provider 27) of FIG. 1 prior to the date of the planned show and registers show "profile" information comprising exhibit information and contact information for represented booths exhibiting at the show. This information represents real profiles and is stored at the service in a data repository analogous to repository 31 of FIG. 1. Entering of information may be accomplished via a PC set-up at the show or from any remote location. In this case, general show information may include show themes, organizations to be represented, location and time/date parameters, and so on. Individual booth profiles may include items to be exhibited, services available, and cell phone numbers of exhibitors working the booths at pre-selected times. In one embodiment, one cell phone is made available at each booth.

At step 99, booth attendant A logs into the service at the beginning of the trade show. The profile information of the booth is already known by the service. In a parallel effort, a trade-show seeker/browser logs into the service with a Web-enabled cell phone at step 101 and browses for registered shows in the vicinity. At step 103, the trade-show browser locates an announcement of a relevant show in his area and reviews content of show information. In the same step, the trade-show seeker selects items of interest. This selection culminates a request profile entered by the trade-show seeker.

At step 105 the trade-show seeker arrives at the scheduled show and logs into the service. The service matches the items of interest (user profile) pre-entered at step 103 with the profile information of all of the participating booths. Profiles are delivered to the trade-show browser who is now at the location of the show at step 107. It is indicated in step 107 that the profile of booth A is the highest-ranking profile that matches the request profile configured at step 103. The trade-show seeker receives the profile information from Booth A on his or her cell phone including booth contact information and may call or visit the indicated booth at step 109. It is noted herein that booth profiles may also be stored locally (at each booth) on respective Bluetooth™ capable devices, and they may be sent to the trade-show seeker when he or she comes into range of each booth. In this case, the seeker's device may match the "real" booth profile against a "request" profile held locally on the seeker's device. If a booth profile significantly matches (according to threshold) the seeker's request profile, his or her device may beep or vibrate, or provide some other alert, indicating a match or a partial match. In the just-described case, a meeter device, cell phone, or hand-held device analogous to devices 33-43 of FIG. 1 may be used.

In yet another aspect of the present invention advertising services are provided for businesses and individuals, based in one embodiment on proximity of two communication devices having close-range wireless communication, as described in considerable detail above. In another embodiment the service is based on an ad server located at a business establishment, typically a small business, such as a cleaners or a fast-food outlet. In this case the ad server is enabled to communicate with communication devices by the a close-range wireless method and protocol, just as in the communication between two devices as described above.

Figure 5:
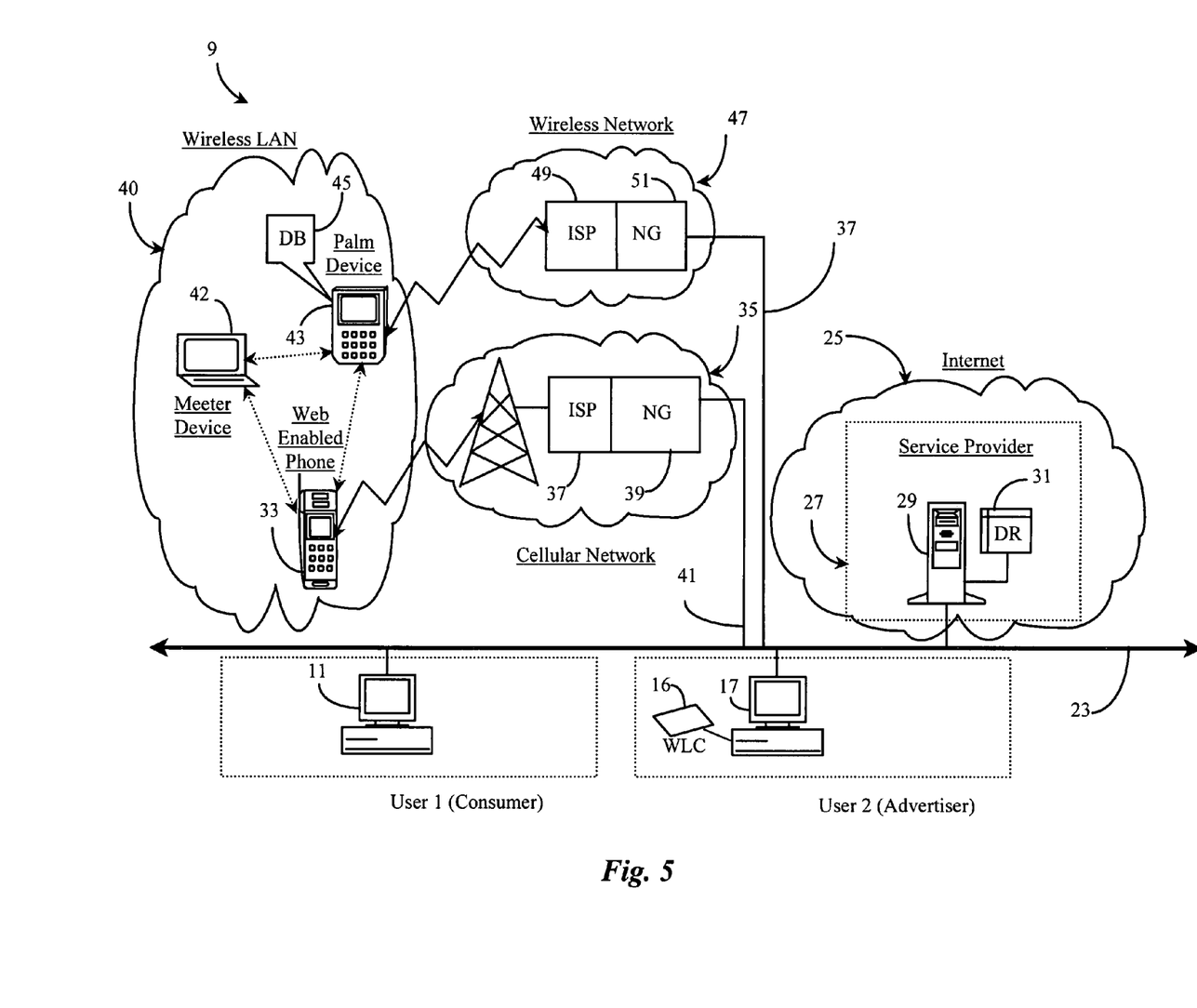
FIG. 5 is an architecture diagram for an advertising server system according to an embodiment of the present invention.

FIG. 5 is an architecture diagram similar to FIG. 1 to aid in description of the ad server aspects of the present invention. In this embodiment there are consumers and advertisers. User 1 in the diagram of FIG. 5 shows a PC station 11 as might be used by a consumer person who subscribes to services in an embodiment of the present invention. The consumer subscriber may use PC 11 to subscribe to services provided by Service Provider 27, and to configure a profile for use by service provider 27. In one embodiment the subscriber may select and designate a preference for ads from certain types of businesses or for certain kinds of products and services, and may also establish active times of day and so forth when he or she wishes the service to be active.

In this embodiment services are proved by Internet-connected server 29 having access to data store 31. It is not required that the subscribing consumer configure through a station such as PC 11; the consumer may also use any Internet-capable appliance, such as, but not limited to, devices 33, 42, and 45 to configure and edit a profile.

An advertiser represented by station 17 as User 2 also becomes and advertising subscriber, and configures his or her services on server 29 in much the same way as the consumer. The advertiser, however, configures certain advertisements and in some cases coupons, to be transmitted to consumers. Like the consumer, the advertised may also configure through any Internet-capable appliance.

As a specific example, consider a consumer who has become a subscriber to the service, and has configured his profile for only advertisements from fast-food businesses, limited strictly to In-and-Out Burger™ and MacDonalds™. Now consider that a MacDonalds restaurant has subscribed to the service as well, and configured for ads presenting a limited-time offer to subscribing consumers that come within the close-range wireless LAN area at the Mac-Donalds restaurant.

The premises equipment at the restaurant may be a PC connected to the Internet, as shown in FIG. 5, or any sort of communication device enabled to detect the local LAN when a consumer subscriber enters the local area. If a PC as shown, then there needs to be a wireless LAN card (WLC) 16 connected to the PC, for participation on the wireless LAN. The premises equipment may also be a cellular telephone, a personal digital assistant (PDA), or any of several other Internet-capable appliances.

Now suppose User 1, carrying a Palm device (a PDA) enabled for the Internet and also for participation on the wireless LAN comes into range of the enabled MacDonalds restaurant. The wireless LAN is activated by virtue of proximity of the two enabled devices, and the active device at the MacDonalds restaurant informs server 29 of the proximity. The service provider immediately checks the consumer profile to be sure it is active, and no consumer restriction may be abridged, and then serves whatever ad and/or coupon that has been configured by the MacDonalds restaurant to the consumer in close proximity.

In many cases the device carried by the consumer will be capable of alerting the consumer, such as by a buzz or an audible signal. The ad may be a message, such as "Mac-Donalds close. Big Mac and Biggy fries 79 cents for the next ten minutes."

To avoid counterfeiting, the ad may be authenticated in some manner. For example, the ad may be provided with a displayable code unique to that MacDonalds, that will display on the consumer's device. As another example, the device in use at the MacDonalds will "know" that the particular consumer is or is not still in range of the wireless LAN when the consumer presents the ad at the counter to get the bargain offered in the ad.

In some cases the advertiser may serve coupons with or instead of the advertisement. In this particular case the MacDonalds may transmit to the consumer a coupon good for 50 cents off on any purchase for the next three days. The value of the coupon is not limited to discounts and the like. A car dealer may give away, once per year, a new car, based on almost any formula the dealer desires to implement.

It may also be necessary that coupons be able to be authenticated. In this case the mechanism might be code accompanying the coupon. The coupon may be date and time stamped, and may carry in addition a special, unique code that will have to be matched for redemption. The codes might be randomly changed, but be tracked in the server's database as to date and time, for matching with requests for redemption. There are many possibilities.

The embodiments of the advertiser/consumer system described just above are Internet-enabled, with ads originating at an Internet server. In another embodiment the ads and the coupons and the like to be transmitted to consumers may be locally-stored in a data repository at, for example PC 17, without Internet cooperation. The premises equipment in this case may be a black box at the advertiser's location, with wireless LAN enablement, and ads and coupons may be server to enabled consumers passing by, just as described above. The local data and software can be provided as a PC application, for example, and may be together with an interactive interface (a GUI for example) whereby a responsible person at the advertiser's location may interact with the system to enable different ads and coupons at different times.

In some embodiments of the invention, discounts and coupons may be traded with other subscribers, or bought and sold. Discounts and coupons may be treated as real property by the consumers, as long as they are honored by the advertisers. A consumer, for example, may be fortunate to get a special coupon, good at a particular MacDonalds, for a twenty-percent discount for the next month. That consumer, however, may be planning to be away for the next month, rendering the property useless to him. The lucky consumer may access server 29 and offer this property for sale to other consumers, who may regularly browse for bargains. The service may provide, along with subscriber profiles, for subscriber accounts to allow the buying and selling, or renting and leasing, of the properties represented by authenticated coupons (in the broad sense). A subscribing consumer's account may be credited and debited over an agreed time period, and settle-up accomplished on some pre-arranged schedule as well.

It will be apparent to one with skill in the art that the present invention may be practiced utilizing a variety of devices and communications paths exemplified in the example architecture of FIG. 1 without departing from the spirit and scope of the present invention. For example in a simplest embodiment "meeter" devices are used for short-range profile exchange and matching without benefit of Internet capabilities or host computers. In more advanced embodiments Internet held profiles may be accessed through Internet-capable and Bluetooth™ enabled devices, host computers, Bluetooth™ modems or network bridges and so on.

It will also be apparent to one with skill in the art that the method of the present invention may be tailored according to a number of service criteria such as for social networking, sports, hobbies, commerce, business networking, convention or trade show activity or other conceivable scenarios without departing from the spirit and scope of the present invention. The rules governing profile matching and profile storage including where profiles are matched are dictated somewhat by the intent of a specific service variation. In some cases real contact information is desired to be publicized and in some cases it is not.

It will further be apparent to one with skill in the art, that instant messages, following established Bluetooth wireless protocol or any other wireless protocol and standard instant message protocol, can be propagated back and forth between utilizing members and activity providers without departing from the spirit and scope of the present invention.

The method and apparatus of the present invention may be practiced by private individuals operating on the Internet, private individuals creating local Bluetooth Wireless LANs, businesses operating on a compatible LAN connected to the Internet, and so on. This includes the use of cell phones. There are many customizable situations. The present invention as taught herein and above should be afforded the broadest of scope. The spirit and scope of the present invention is limited only by the claims that follow.

What is claimed is:

1. A system for commerce, comprising:

an Internet-connected subscription server hosted by an enterprise, said server storing consumer profiles or accessing stored consumer profiles;

at least one Internet-connected computerized appliance and wireless LAN of at least one commercial business registered as a subscriber with the host of the Internet-connected server, the business selling one or more products or services; and portable communication devices enabled to connect to the wireless LAN provided by the commercial business when within range of the wireless LAN, the portable communication devices in the possession of consumers, and configured to receive and download digital coupons from the at least one commercial business, when within range of the wireless LAN, the digital coupons having specific value related to one or more of the products or services wherein the products or services are determined according to preferences created by the consumer and stored at the enterprise;

said subscription server configured to match said consumer profiles with identification of said at least one commercial business, select one or more commercial businesses as matches, and to enable the receipt of said digital coupons only from the computerized appliances of one or more said commercial businesses matching preferences in the stored profiles of consumers.

2. A method for a commerce provider comprising:

(a) providing an Internet-connected subscription server;

(b) registering a commercial business at the Internet-connected subscription server selling one or more products or services, the business having an Internet-connected computerized appliance and a wireless LAN;

(c) registering a consumer at the Internet-connected subscription server, the consumer having a portable communication device enabled to connect to the wireless LAN provided by the commercial business when within range of the wireless LAN;

(d) storing a preference of products or services, configured by the consumer, at the Intenet-connectecd subscription server including at least selecting specific businesses to allow receipt of coupons at the consumer's portable communication device for products or services only from said selected businesses;

(e) identifying the consumer's portable communication device automatically when in range of the wireless LAN, matching the identity with a stored preference for the consumer; and (f) providing the consumer an electronic coupon on the portable communication device via the wireless LAN from the commercial business according to the consumer's stored preferences.

* * * * *

UNITED STATES PATENT AND TRADEMARK OFFICE
CERTIFICATE OF CORRECTION

PATENT NO. : 7,324,957 B2
APPLICATION NO. : 10/972120
DATED : January 29, 2008
INVENTOR(S) : Mark A. Boys Page 1 of 1

It is certified that error appears in the above-identified patent and that said Letters Patent is hereby corrected as shown below:

On the title page: item (63); please delete;

Section 63 "Related U.S. Application Data" was printed in error as there is no claim to priority or related application data Signed and Sealed this Twentieth Day of May, 2008

JON W. DUDAS
*Director of the United States Patent and Trademark Office*

UNITED STATES PATENT AND TRADEMARK OFFICE
CERTIFICATE OF CORRECTION

PATENT NO. : 7,324,957 B2
APPLICATION NO. : 10/972120
DATED : January 29, 2008
INVENTOR(S) : Mark A. Boys It is certified that error appears in the above-identified patent and that said Letters Patent is hereby corrected as shown below:

In the Cross-Reference to Related Documents: Column 1, after the title PROXIMAL ADVERTISING USING HAND-HELD COMMUNICATION DEVICES, please delete lines 4-17 as follows:

"CROSS-REFERENCE TO RELATED DOCUMENTS

The present application is a continuation-in-part of, and claims priority to, co-pending patent application Ser. No. 10/733,076 entitled, "Networking by Matching Profile Information Over a Data Packet-Network and a Local Area Network", which was filed on Dec. 10, 2003, which is a continuation of patent application Ser. No. 09/755,768 entitled "Networking by Matching Profile Jn*rmation Over a Data Packet-Network and a Local Area Network", which was filed on Jan. 5, 2001, and issued as patent Ser. No. 6,690,918 on Feb. 10, 2004. Both of the above mentioned properties are incorporated herein in their entirety."

Signed and Sealed this

Twenty-sixth Day of May, 2009

JOHN DOLL
*Acting Director of the United States Patent and Trademark Office*